United States Patent
Jiang

(10) Patent No.: US 9,957,011 B2
(45) Date of Patent: May 1, 2018

(54) TWO-WHEELED BALANCING ELECTRIC VEHICLE

(71) Applicant: JIANGXI DI AN NEW ENERGY VEHICLE CO., LIMITED, Fuzhou Jiangxi (CN)

(72) Inventor: Shuangfeng Jiang, Jiangxi (CN)

(73) Assignee: JINAN METAL HABER METALLURGICAL TECHNOLOGY DEVELOPMENT CO., LTD., Jinan, Shandong (CN)

( * ) Notice: Subject to any disclaimer, the term of this patent is extended or adjusted under 35 U.S.C. 154(b) by 8 days.

(21) Appl. No.: 14/979,463

(22) Filed: Dec. 27, 2015

(65) Prior Publication Data

US 2017/0088211 A1  Mar. 30, 2017

(30) Foreign Application Priority Data

Sep. 30, 2015 (CN) .......................... 2015 1 0639766

(51) Int. Cl.
*B62K 3/00* (2006.01)
*B62K 11/00* (2006.01)

(52) U.S. Cl.
CPC ............ *B62K 3/007* (2013.01); *B62K 11/007* (2016.11)

(58) Field of Classification Search
CPC .............................. B62K 3/007; B62K 11/007
USPC .......................................................... 180/220
See application file for complete search history.

(56) References Cited

U.S. PATENT DOCUMENTS 9,376,155 B2\* 6/2016 Ying ...................... B62K 3/007
2007/0251735 A1\* 11/2007 Kakinuma ............. A63C 17/08
180/6.5

\* cited by examiner

*Primary Examiner* — Joseph M Rocca
*Assistant Examiner* — Felicia L. Brittman
(74) *Attorney, Agent, or Firm* — Global IP Services; Tianhua Gu

(57) ABSTRACT

A two-wheeled balancing electric vehicle; a connecting body partially overlaps with a left support assembly and a right support assembly respectively; a plurality of elastic devices are arranged in the vertical direction, with at least one elastic device disposed at the front end position between the connecting body and the right support assembly, with at least one elastic device disposed at the rear end position between the connecting body and the right support assembly, with at least one elastic device disposed at the front end position between the connecting body and the left support assembly, with at least one elastic device disposed at the rear end position between the connecting body and the left support assembly. Under the function of the elastic device at the front end, the force of the malfunction of leaning backwards will be absorbed, in order to prevent the balancing vehicle from opening self-sensing of leaning backwards, so that the danger is avoided.

4 Claims, 6 Drawing Sheets

TWO-WHEELED BALANCING ELECTRIC VEHICLE

CROSS REFERENCE TO RELATED PATENT APPLICATION

The present application claims the priority of CN 201510639766.9 filed on Sep. 30, 2015, which application is incorporated herein by reference.

TECHNICAL FIELD OF THE INVENTION

The present invention relates to a self-balancing electric vehicle, more particularly, to a two-wheeled sensor-controlled vehicle.

BACKGROUND OF THE INVENTION

The balancing electric vehicle, also called as sensor-controlled vehicle and all-terrain vehicle, works mainly on the basic principle that is called "dynamic stability"; it uses the gyroscope and acceleration sensor in the vehicle body to detect the change of the vehicle body posture, and uses the servo control system to precisely drive the motor to make corresponding adjustment, in order to maintain the balance of the system. Because it is interesting, it is quite popular among the young and children; it falls into the categories of emergent products.

As to the uniaxial or biaxial balancing vehicle in the art, when the feet of the user stands on the vehicle, as long as there is a leaning force, the vehicle body itself will sense very sensitively and then begins moving, which is not conducive to the safe use of beginners; when the speed is too fast, it will even lead to vehicle rollover, or when the driving speed is too fast, uneven road leads to instability of gravity center, under which circumstance, the slight unbalanced leaning of the force of left foot or right foot will make the vehicle body begin the operation of sensitive sensing, which is liable to make the user fall over and get injured.

SUMMARY OF THE INVENTION

The present invention, in order to solve the problems in the prior art, provides a balancing electric vehicle.

To achieve the above object, the technical solution of the present invention is: a two-wheeled balancing electric vehicle, comprising a middle support assembly in the middle, a left support assembly and a right support assembly respectively arranged at two sides of the middle support assembly, wherein one end of the left support assembly and one end of the right support assembly, opposite to each other, are respectively provided with a left wheel and a right wheel that are subject to the control of their respective motor; the middle support assembly comprises a connecting body; on the connecting body, a first connecting section is arranged and connected to the left support assembly through rotation of bearings, and a second connecting section is arranged and connected to the right support assembly through rotation of bearings, wherein the connecting body partially overlaps with the left support assembly and the right support assembly respectively, with a plurality of elastic devices arranged in the overlap region in the vertical direction, wherein at least one elastic device is disposed at the front end position between the connecting body and the right support assembly, at least one elastic device is disposed at the rear end position between the connecting body and the right support assembly, at least one elastic device is disposed at the front end position between the connecting body and the left support assembly, and at least one elastic device is disposed at the rear end position between the connecting body and the left support assembly.

Preferably, the elastic device is spring, reed, inflatable bubble, elastic rubber body, etc. elastic devices known to the person skilled in the art.

Preferably, at least two elastic devices between the connecting body and the right support assembly are an integrated reed, with at least two curved bumps facing upwards arranged on the reed.

Preferably, at least two elastic devices between the connecting body and the left support assembly are an integrated reed, with at least two curved bumps facing upwards arranged on the reed.

Preferably, the connecting body presents as a horizontal plate; the first connecting section comprises one left vertical plate that is fixed to the connecting body, wherein the left vertical plate is provided with a left fixing axis, and the left support assembly comprises a left sleeve that fits together with the left fixing axis in rotation; the second connecting section comprises one right vertical plate that is fixed to the connecting body, wherein the left vertical plate is provided with a right fixing axis, and the left support assembly comprises a left sleeve that fits together with the right fixing axis in rotation.

Preferably, the left fixing axis goes through the left sleeve, wherein a clamp is arranged on the left fixing axis at a position that is not covered by the left sleeve, to prevent the left fixing axis from exiting; the right fixing axis goes through the right sleeve, wherein a clamp is arranged on the right fixing axis at a position that is not covered by the right sleeve, to prevent the right fixing axis from exiting.

Preferably, bearings between the left fixing axis and the left sleeve are arranged to be two, moreover, along with the left fixing axis and in a radial pattern as to the left sleeve; bearings between the right fixing axis and the right sleeve are arranged to be two, moreover, along with the right fixing axis and in a radial pattern as to the right sleeve.

The balancing electric vehicle of the present invention, when it appears the problems of not standing stably or of poor road conditions, such as when a user leans backwards, will make the left and right support assemblies rotate backwards in relation to a middle support assembly; at this time, under the function of the elastic device at the front end, the force of the malfunction of leaning backwards will be absorbed, in order to prevent the balancing vehicle from opening self-sensing of leaning backwards, so that the danger is avoided.

DETAIL DESCRIPTION OF THE INVENTION

In order to make it easy to understand the technical problem solved, the technical solution adopted and the technical effect achieved in the present invention, the embodiments of the present invention are further described in combination with the specific figures below.

Figure 1:
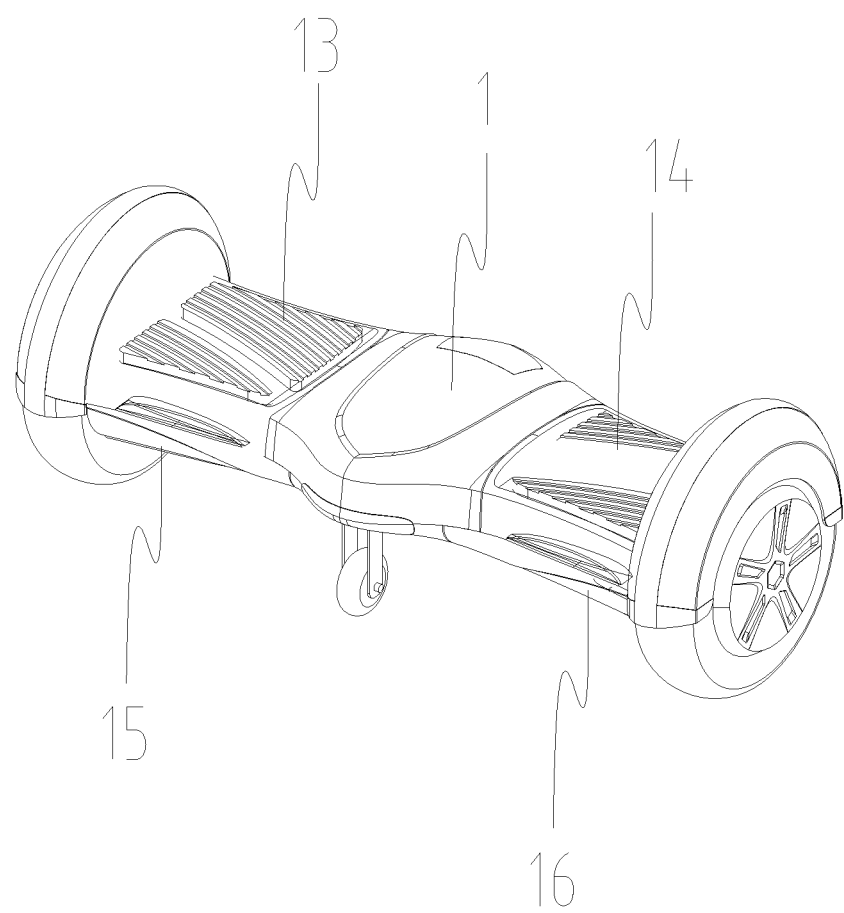
FIG. 1 is a view of the structure of the balancing electric vehicle in the present invention.
Figure 2:
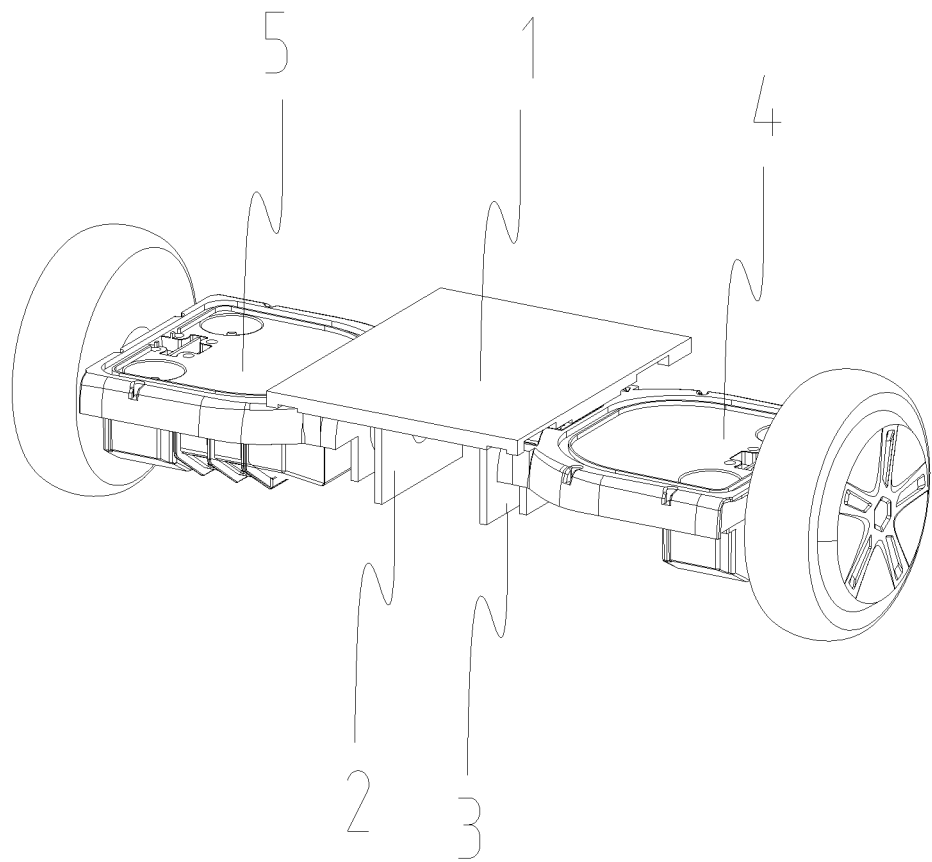
FIG. 2 is a view of the internal structure of the balancing electric vehicle in the present invention.

With reference to FIG. 1 and FIG. 2, the present invention provides a two-wheeled balancing electric vehicle; it comprises a middle support assembly in the middle, also includes a left support assembly 5 and a right support assembly 4 at the two sides of the middle support assembly, also includes a left lower housing 15 and a right lower housing 16 that are arranged below the left support assembly 5 and the right support assembly 4, and a left pedal 13 and a right pedal 14 that are arranged above the left support assembly 5 and the right support assembly 4.

Wherein, one end of the left support assembly 5 and one end of the right support assembly 4, opposite to each other, are respectively provided with a left wheel and a right wheel that are subject to the control of their respective motor, that is to say, one end of the left support assembly 5 at the outer side is rotationally connected to the left wheel that is subject to the control of motor, and one end of the right support assembly 4 at the outer side is rotationally connected to the right wheel that is subject to the control of motor.

The middle support assembly comprises a connecting body 1; on the connecting body 1, a first connecting section is arranged and connected to the left support assembly 5 through rotation of bearings, and a second connecting section is arranged and connected to the right support assembly 4 through rotation of bearings. In one embodiment of the present invention, the connecting body 1 presents as a horizontal plate; the first connecting section comprises one left vertical plate 2 that is fixed below the connecting body 1, wherein the left vertical plate 2 is provided with a left fixing axis, and the left support assembly 5 comprises a left sleeve 7 that fits together with the left fixing axis in rotation; the second connecting section comprises one right vertical plate 3 that is fixed below the connecting body 1, wherein the right vertical plate 3 is provided with a right fixing axis 11, and the right support assembly 4 comprises a right sleeve 6 that fits together with the right fixing axis 11 in rotation.

Figure 3:
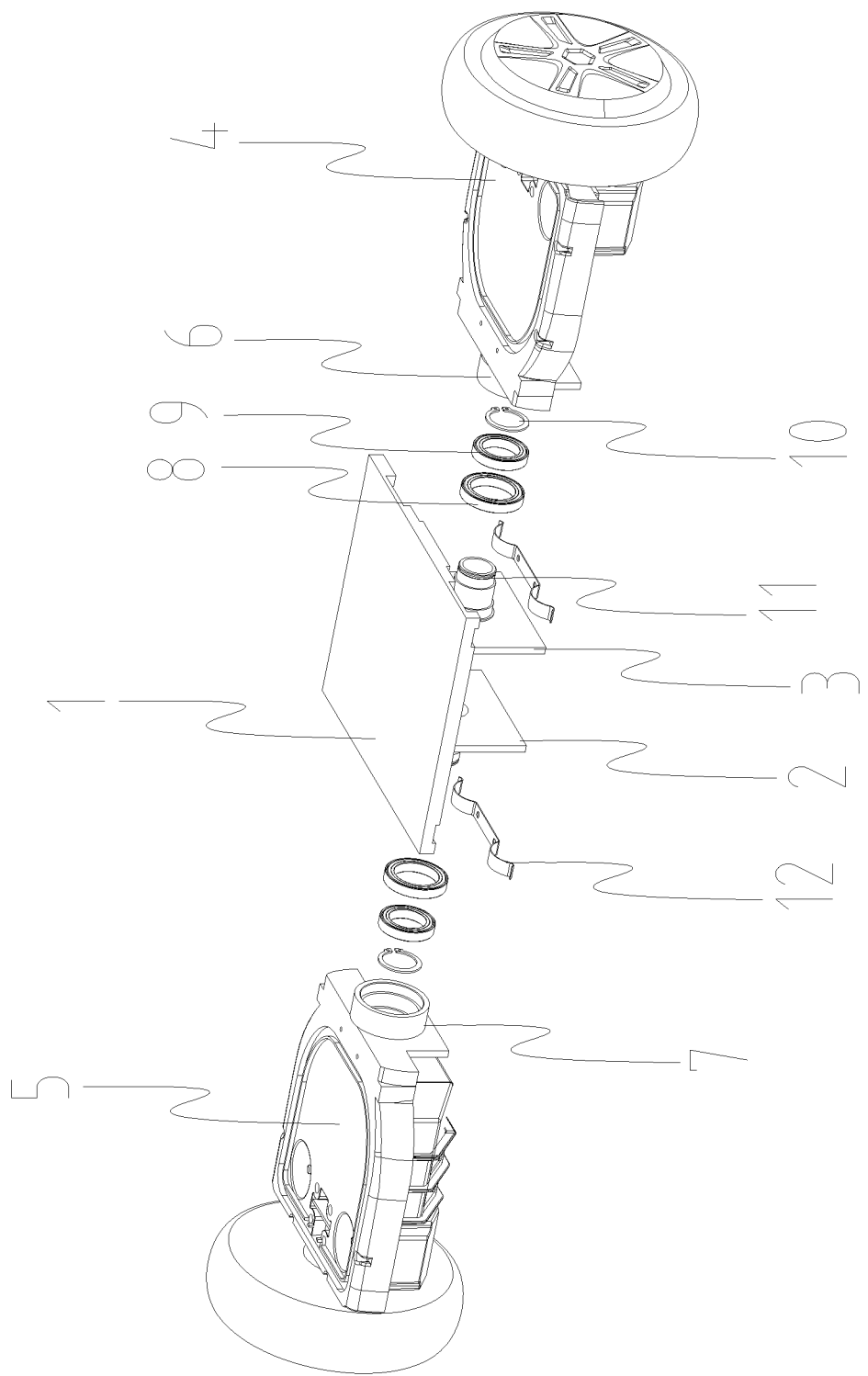
FIG. 3 is an exploded view of FIG. 2

With reference to FIG. 3, in the installation, the right fixing axis 11 on the right vertical plate 3 extends into the right sleeve 6 of the right support assembly 4; the two fit together through rotation of bearing. In a preferred embodiment of the present invention, two bearings 8, 9 are arranged between the right fixing axis 11 and the right sleeve 6; the two bearings are along with the right fixing axis 11 and in a radial pattern as to the right sleeve 6. For example, the two bearings 8, 9 are respectively arranged at two sides of the right sleeve 6; the right fixing axis 11 and the inner ring of the two bearings 8, 9 interfere and fit together, the right sleeve 6 and the outer ring of the two bearings 8, 9 interfere and fit together, which realizes that the right support assembly 4 is rotationally connected to the middle support assembly.

Based on the same grounds, the left fixing axis on the left vertical plate 2 extends into the left sleeve of the left support assembly 5; the two fit together through rotation of bearing. In a preferred embodiment of the present invention, two bearings are arranged between the left fixing axis and the left sleeve; the two bearings are along with the left fixing axis and in a radial pattern as to the left sleeve. For example, the two bearings are respectively arranged at two sides of the left sleeve; the left fixing axis and the inner ring of the two bearings interfere and fit together, and the left sleeve and the outer ring of the two bearings interfere and fit together, which realizes that the left support assembly 5 is rotationally connected to the middle support assembly.

In a preferred embodiment of the present invention, the right fixing axis 11 goes through the right sleeve 6; a clamp 10 is arranged on the right fixing axis 11 at a position that is not covered by the right sleeve 6, to prevent the right fixing axis 11 from exiting; for example, a ring of circular grooves may be arranged on the right fixing axis 11, which may clamp the clamp 10 inside. For the same reason, the left fixing axis goes through the left sleeve 7, wherein a clamp is arranged on the left fixing axis at a position that is not covered by the left sleeve 7, to prevent the left fixing axis from exiting.

In the above-described embodiments, the left and right sleeves are arranged on the left and right support assemblies, while the left and right fixing axis are arranged on the middle support assembly; of course, to the person skilled in the art, it is very easy to envisage that the left and right sleeves are disposed on the middle support assembly; when the left and right fixing axis are provided on the left and right support assemblies, it can also achieve rotational connection between the left and right support assemblies and the middle support assembly.

The balancing electric vehicle of the present invention is arranged with a middle support assembly in the middle, while the left and right support assemblies are respectively rotationally connected to two sides of the middle support assembly; this structure can greatly disperse the pressure on the position of rotational connection of the balancing vehicle in the non-rotation direction, which ensures that the coaxial degree at the position of connection; at the same time, the left and right support assemblies are connected to the middle support assembly respectively through the two bearings, which greatly reduces the friction force at the position of rotational connection and improves the working life as well as the flexibility of the balancing electric vehicle at the same time.

In the balancing electric vehicle of the present invention, the connecting body 1 partially overlaps with the left support assembly 5 and the right support assembly 4 respectively; for example, a part of the structure of the left support assembly 5 extends below the connecting body 1, and the two arranged in parallel to each other. The overlap region is also provided with a plurality of elastic devices in the vertical direction, wherein at least one elastic device is disposed at the front end position between the connecting body 1 and the right support assembly 4, at least one elastic device is disposed at the rear end position between the connecting body 1 and the right support assembly 4, at least one elastic device is disposed at the front end position between the connecting body 1 and the left support assembly 5, and at least one elastic device is disposed at the rear end position between the connecting body 1 and the left support assembly 5.

Figure 4:
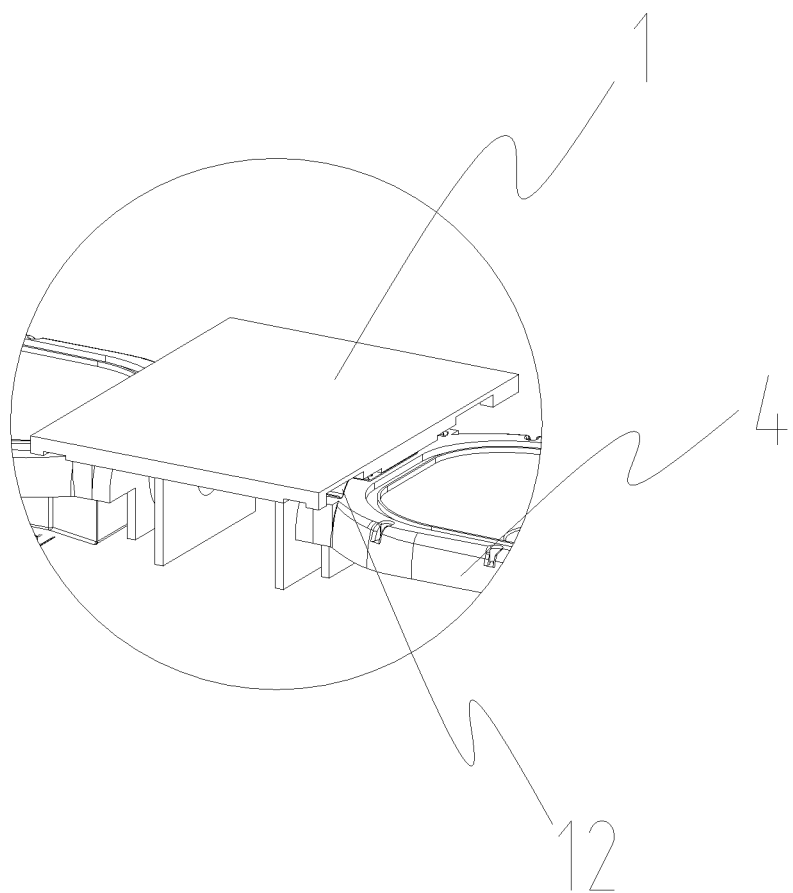
FIG. 4 is a view of partial structure in FIG. 2

In a preferred embodiment of the present invention, the elastic device is spring, reed, inflatable bubble, elastic rubber body, etc. elastic devices known to the person skilled in the art. In a specific embodiment of the present invention, at least two elastic devices between the connecting body 1 and the right support assembly 4 are an integrated reed 12; please refer to FIGS. 3 and 4. At least two curved bumps facing upwards are arranged on the reed 12; the curved bumps are used as deformation part of the elastic device. At the time of installation, the reed 12 can be fixed on the right support assembly 4, with two curved bumps respectively fitting together with the front end and the rear end of the connecting body 1; of course, the reed 12 may also be fixed on the connecting body 1, with the two curved bumps respectively fitting together with the front end and the rear end of the right support assembly 4.

Based on the same grounds, at least two elastic devices between the connecting body 1 and the left support assembly 5 are an integrated reed 12; please refer to FIG. 3. At least two curved bumps facing upwards are arranged on the reed 12; the curved bumps are used as deformation part of the elastic device. At the time of installation, the reed 12 can be fixed on the left support assembly 5, with two curved bumps respectively fitting together with the front end and the rear end of the connecting body 1; of course, the reed 12 may also be fixed on the connecting body 1, with the two curved bumps respectively fitting together with the front end and the rear end of the left support assembly 5.

When it appears the problems of not standing stably or poor road condition, such as when a user leans backwards, it will make the left and right support assemblies rotate backwards in relation to the middle support assembly; at this time, under the function of the elastic device at the front end, the force of the malfunction of leaning backwards will be absorbed, in order to prevent the balancing vehicle from opening self-sensing of leaning backwards, so that the danger is avoided.

Figure 5:
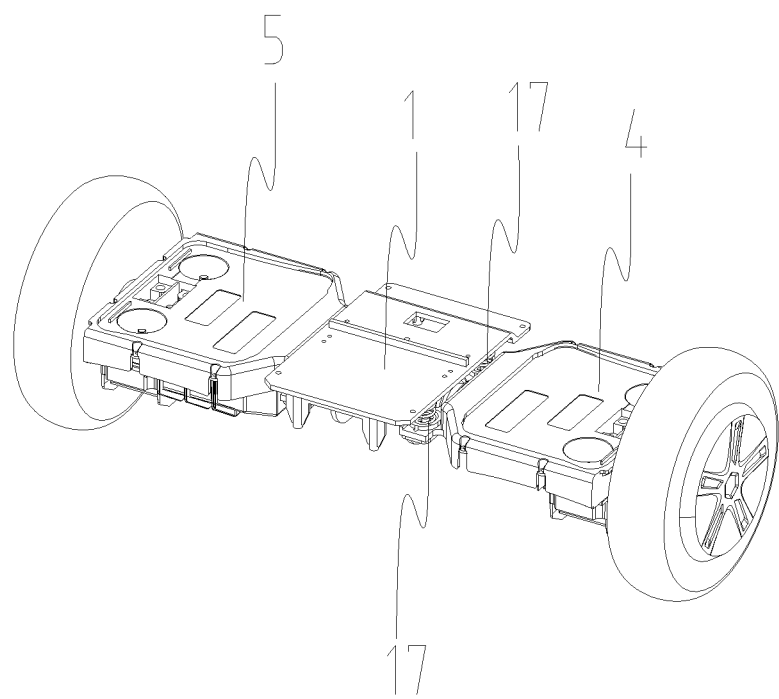
FIG. 5 is a view of the internal structure of another embodiment of the balancing electric vehicle in the present invention.
Figure 6:
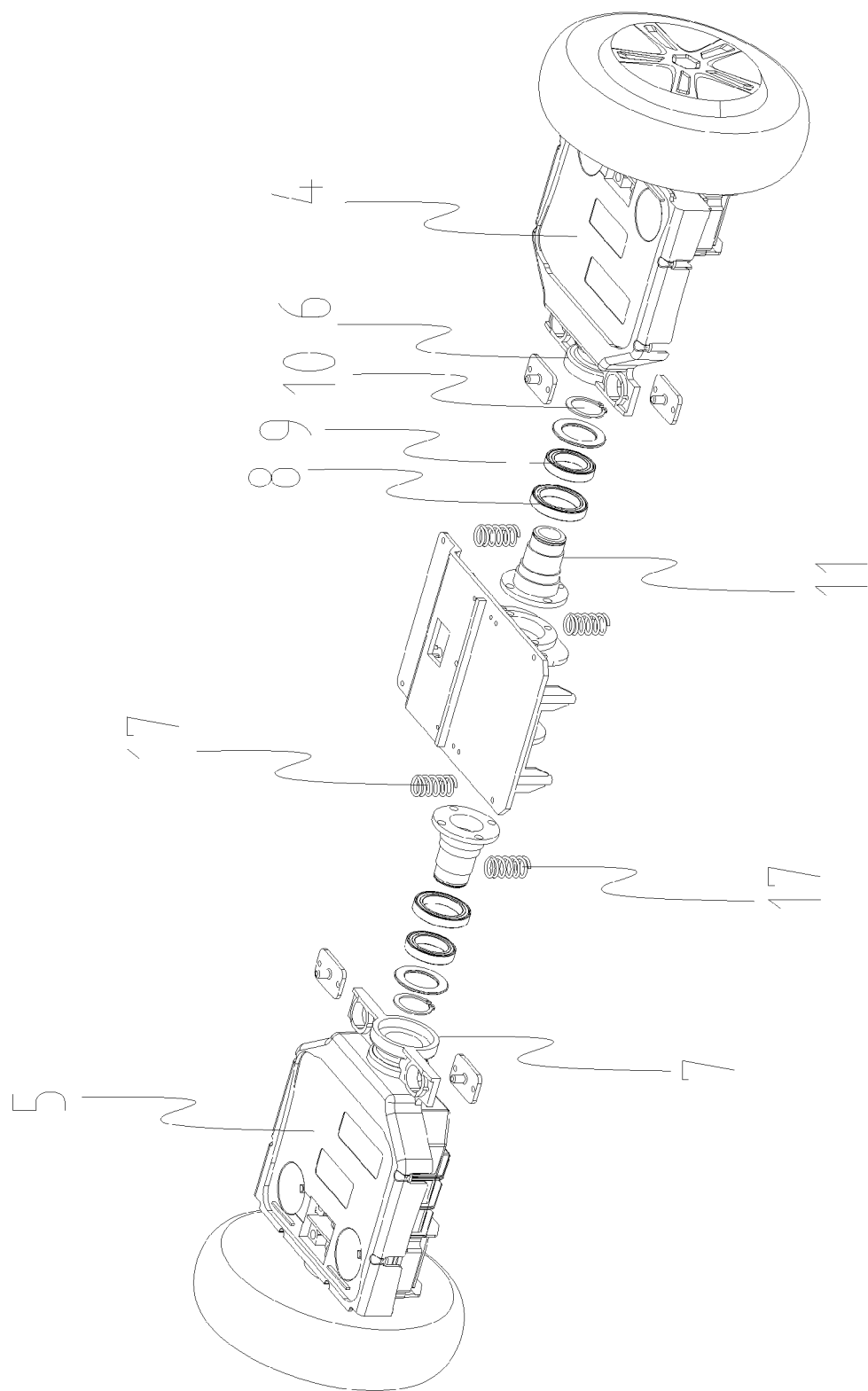
FIG. 6 is an exploded view of FIG. 5.

When the user stands on the left and right support assemblies of the balancing vehicle, it will generate a force; this force acts to ease under the function of the elastic device; after the user stands stably, he needs to overcome the elastic force of the elastic device, and the vehicle will begin to move based on sensing only the vehicle body leans. At the same time, the increase of the elastic device can also ease the problem of uneven force of left and right feet that is caused by failure to control the force evenly due to not standing stably after standing on the vehicle, and this effectively alleviates malfunction or error reaction caused by not standing stably, uneven force, poor road condition, etc problems, which reduces the risk of danger. In another specific embodiment of the present invention (please refer to FIG. 5 and FIG. 6), the elastic devices, in the way of spring 17, are mounted respectively between the connecting body 1, and the left support assembly 4 and the right support assembly 5; in order to install the spring 17, a groove for accommodating the spring 17 or a projecting column for clamping the spring 17 can be arranged; all of these fall into common knowledge to the person skilled in the art, and are not to be specifically described at this place.

The present invention has been described in detail in the way of preferred embodiments. However, through the study of the foregoing content, changes and additions to the embodiments are obvious to the person skilled in the art. The Applicant's intent is that all of these changes and additions fall into the scope of protection of the claims of the present invention.

What is claimed is:

1. A two-wheeled balancing electric vehicle comprising a middle support assembly in the middle, a left support assembly and a right support assembly respectively arranged at two sides of the middle support assembly, wherein one end of the left support assembly and one end of the right support assembly, opposite to each other, are respectively provided with a left wheel and a right wheel that are subject to the control of their respective motors;

the middle support assembly comprises a connecting body; on the connecting body, a first connecting section is arranged that is connected to the left support assembly through rotation of bearings, and a second connecting section is arranged that is connected to the right support assembly through rotation of bearings, the first connecting section comprises a left vertical plate fixed to the connecting body, the left vertical plate is provided with a left fixing axis, and the left support assembly comprises a left sleeve that fits together with the left fixing axis in rotation; the second connecting section comprises a right vertical plate fixed to the connecting body, the right vertical plate is provided with a right fixing axis, and the right support assembly comprises a right sleeve that fits together with the right fixing axis in rotation;

the connecting body partially overlaps with the left support assembly and the right support assembly respectively, an elastic device is arranged in each one of the right and left overlap regions in the vertical direction, the elastic device is an integrated reed, with two curved bumps facing upwards arranged on the reed.

2. The two-wheeled balancing electric vehicle according to claim 1, characterized in that: the reed is supported on the connecting body or on the support assembly.

3. The two-wheeled balancing electric vehicle according to claim 1, characterized in that: the left fixing axis goes through the left sleeve, wherein a clamp is arranged on the left fixing axis at a position that is not covered by the left sleeve, to prevent the left fixing axis from exiting the left sleeve; the right fixing axis goes through the right sleeve, wherein a clamp is arranged on the right fixing axis at a position that is not covered by the right sleeve, to prevent the right fixing axis from exiting the right sleeve.

4. The two-wheeled balancing electric vehicle according to claim 1, characterized in that: bearings between the left fixing axis and the left sleeve are arranged to be two, bearings between the right fixing axis and the right sleeve are arranged to be two.

* * * * *